C. BALLREICH.
LAWN SPRINKLER.
APPLICATION FILED AUG. 14, 1908.
943,172.
Patented Dec. 14, 1909.
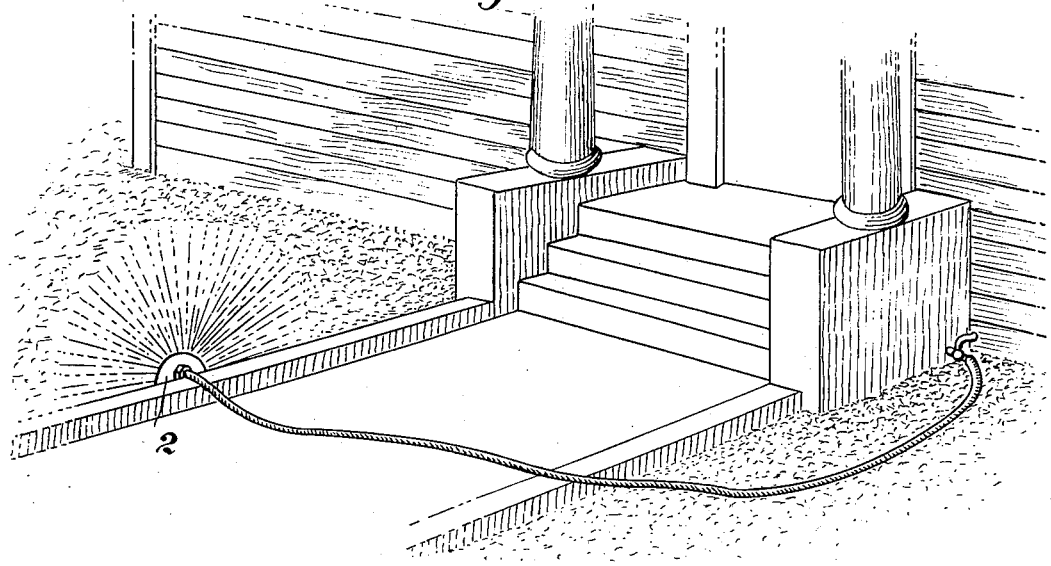
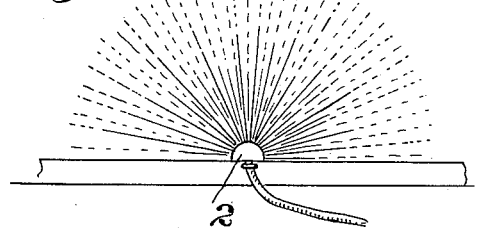
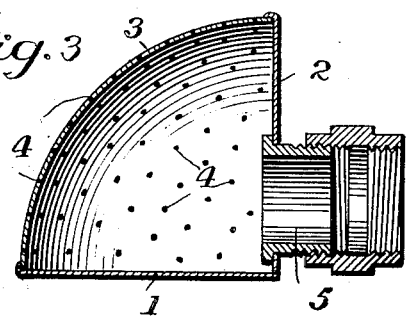
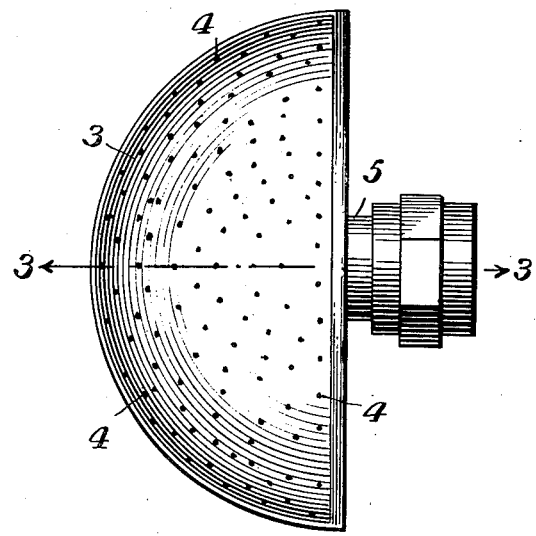
Witnesses
J. G. Finkel
J. J. McCarthy
Inventor
Charles Ballreich
By
Foster, Freeman, Watson & Coit
Attorneys

UNITED STATES PATENT OFFICE.

CHARLES BALLREICH, OF PUEBLO, COLORADO.

LAWN-SPRINKLER.

943,172.  Specification of Letters Patent.  Patented Dec. 14, 1909.

Application filed August 14, 1908.  Serial No. 448,570.

*To all whom it may concern:*

Be it known that I, CHARLES BALLREICH, a citizen of the United States, residing at Pueblo, in the county of Pueblo and State of Colorado, have invented certain new and useful Improvements in Lawn-Sprinklers, of which the following is a specification.

This invention relates to lawn sprinklers, and its objects are to produce a simple, compact and easily handled device having the advantages hereinafter described.

It embodies a spraying head or nozzle of peculiar shape and construction, whereby the water may be distributed more evenly and more accurately than with the nozzles in common use, and in which the direction of the spray may be accurately controlled.

The novel features will be apparent from the following description taken in connection with the drawing.

In the accompanying drawings,—Figure 1 is a perspective view showing my sprinkler in use on a lawn; Fig. 2 is a plan view of the sprinkler head; and Fig. 3 is a section of the sprinkler head taken on the line 3—3 of Fig. 2; and Fig. 4 is a plan view of my device in operation, showing the limit of the spray discharged by it.

As shown in the drawings, my sprinkler embodies a closed head made up of the imperforate bottom plate 1, the imperforate vertical rear end plate 2 and the curved plate 3, which is provided with the perforations 4 arranged radially therein. A coupling piece 5 for the water supply pipe is secured in a hole in the plate 2.

It will be observed that the sprinkler head as thus formed is in the shape of a quarter of a sphere, the discharge perforations for the water being arranged in the curved part and being radial, thus discharging the water evenly and accurately in advance of a line across the device. In other words when the bottom plate 1 is placed upon the ground the water is sprayed evenly upwardly and forwardly and to the right and left, but not rearwardly, and therefore it is possible for the user to approach the sprinkler from the rear without having the water discharged on him.

It is also possible to place the sprinkler against the side of the house or other object and thus sprinkle the grass without having any water discharged on the house itself or in the windows. Also the sprinkler may be placed on the edge of the parking so as to sprinkle forward and to the right and left but not back on the sidewalk. This enables one to sprinkle along the sidewalk without wetting it or the persons passing along it.

It is a well-known fact that the continued sprinkling of the side of a brick or stone house discolors it up to the height of the spraying and also washes the mortar from between the bricks or stone, and in the case of frame houses the base boards are discolored and made to rot.

My invention has the advantage of avoiding these objections which are incident to the use of the ordinary sprinkler.

While I prefer to make the sprinkler head in the form of a quarter of a sphere, it is of course apparent that the curvature of the perforated plate need not be that of a sphere and may be of less extent than a quarter of a sphere.

Changes may be made in the particular shape so long as the perforations direct the water in substantially radial lines upwardly and forwardly.

In addition to its adaptability for use upon the ground my sprinkler may of course be used as a hand sprinkler. I prefer to make the sprinkler head of sheet brass pressed into form, but it will be understood that any other suitable metal or material may be used in making it.

Having thus described the invention, what is claimed is:—

1. A lawn sprinkler embodying a hollow closed head having a flat bottom, and upright rear wall and a spheroidal upper portion, the inclination of which is downward from the rear wall, the said head being provided with an inlet in the rear wall, and the said upper portion only being provided with radial perforations.

2. A lawn sprinkler embodying a hollow closed head in the shape of a quarter of a sphere provided with an inlet for water and with discharge perforations in the curved portion only.

In testimony whereof I affix my signature in presence of two witnesses.

CHARLES BALLREICH.

Witnesses:
JACOB JEWELL,
F. H. DAVIS.